United States Patent
Zhou et al.

(10) Patent No.: US 10,423,725 B2
(45) Date of Patent: Sep. 24, 2019

(54) INTENTION ACQUISITION METHOD, ELECTRONIC DEVICE AND COMPUTER-READABLE STORAGE MEDIUM

(71) Applicant: Ping An Technology (Shenzhen) Co., Ltd., Shenzhen, Guangdong (CN)

(72) Inventors: Junkun Zhou, Guangdong (CN); Min Guan, Guangdong (CN); Jianghao Yan, Guangdong (CN); Xiaoming Peng, Guangdong (CN)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/337,929

(22) PCT Filed: Aug. 31, 2017

(86) PCT No.: PCT/CN2017/100056
§ 371 (c)(1),
(2) Date: Mar. 29, 2019

(87) PCT Pub. No.: WO2019/024162
PCT Pub. Date: Feb. 7, 2019

(65) Prior Publication Data
US 2019/0228069 A1    Jul. 25, 2019

(30) Foreign Application Priority Data
Aug. 4, 2017    (CN) .......................... 2017 1 0660484

(51) Int. Cl.
*G06F 17/27*    (2006.01)
*G06N 5/02*    (2006.01)
(Continued)

(52) U.S. Cl.
CPC ...... *G06F 17/2785* (2013.01); *G06F 16/2455* (2019.01); *G06F 16/3329* (2019.01); *G06F 17/277* (2013.01); *G06N 5/02* (2013.01)

(58) Field of Classification Search
CPC ........ G06N 7/005; G06N 20/00; G06N 5/022; G06F 17/2785; G06F 17/2705;
(Continued)

(56) References Cited

U.S. PATENT DOCUMENTS 5,787,426 A * 7/1998 Koshiba .................... G06F 7/22
6,212,537 B1 * 4/2001 Nosohara ............ G06F 17/2872
715/264

(Continued)

FOREIGN PATENT DOCUMENTS

CN    106447346 A    2/2017

OTHER PUBLICATIONS

International search report of PCT Patent Application No. PCT/CN2017/100056 dated May 10, 2018.
(Continued)

*Primary Examiner* — Vijay B Chawan

(57) ABSTRACT

An intention acquisition method, an electronic device and a computer-readable computer storage are provided. The method includes: segmenting a text sentence into multiple words; mapping the multiple words obtained by segmentation to preset keywords; determining an intention node most semantically approximate to the mapped words in a preset knowledge graph; performing semantic supplementing on the most approximate intention node according to a preset supplementing manner to obtain a supplemented intention node; if the supplemented intention node is an egress node, acquiring detailed intention information associated with the supplemented intention node in a specified range in a detailed intention layer of the knowledge graph according to
(Continued)

intention information corresponding to the supplemented intention node, and determining an intention of a user according to the acquired detailed intention information; and if the supplemented intention node is a non-egress node, determining the intention of the user according to a preset query mode.

9 Claims, 7 Drawing Sheets

(51) Int. Cl.
  *G06F 16/2455* (2019.01)
  *G06F 16/332* (2019.01)
(58) Field of Classification Search
  CPC ...... G06F 17/2795; G06F 17/20; G06F 17/27;
      G06F 17/279; G06F 17/2735; G06F 17/2755; G06F 17/218; G06F 17/271;
      G06F 17/2872; G06F 17/289; G06F 7/22
  USPC ....... 704/9, 235, 257; 707/999.003, 999.004,
      707/999.005, 888.007, 711; 706/52;
      709/204, 205; 715/210, 264
  See application file for complete search history.

(56) References Cited

U.S. PATENT DOCUMENTS

| | | | | |
|---|---|---|---|---|
| 6,243,670 | B1 * | 6/2001 | Bessho | G06F 17/2785 704/9 |
| 9,092,802 | B1 * | 7/2015 | Akella | G06Q 30/0256 |
| 9,524,291 | B2 * | 12/2016 | Teodosiu | G06F 17/2785 |
| 9,818,405 | B2 * | 11/2017 | Arslan | G06F 17/279 |
| 9,916,538 | B2 * | 3/2018 | Zadeh | G06N 7/005 |
| 2002/0032733 | A1 * | 3/2002 | Howard | G06Q 10/06 709/204 |
| 2012/0089394 | A1 * | 4/2012 | Teodosiu | G06F 17/2785 704/235 |
| 2014/0079297 | A1 * | 3/2014 | Tadayon | G06K 9/00 382/118 |
| 2014/0201126 | A1 * | 7/2014 | Zadeh | G06N 7/005 706/52 |
| 2016/0041986 | A1 * | 2/2016 | Nguyen | G06Q 50/01 707/711 |
| 2017/0255611 | A1 * | 9/2017 | Kubosawa | G06F 17/2705 |
| 2017/0270921 | A1 * | 9/2017 | Arslan | G06F 17/279 |
| 2017/0310928 | A1 * | 10/2017 | Nakano | H04M 11/06 |
| 2017/0371861 | A1 * | 12/2017 | Barborak | G06N 20/00 |
| 2019/0012388 | A1 * | 1/2019 | Torras | G06F 17/2785 |

OTHER PUBLICATIONS

1st Office Action of counterpart Chinese Patent Application No. 201710660484.6 dated May 29, 2018.

Notification to Grant Patent Right of counterpart Chinese Patent Application No. 201710660484.6 dated Jun. 26, 2018.

* cited by examiner

INTENTION ACQUISITION METHOD, ELECTRONIC DEVICE AND COMPUTER-READABLE STORAGE MEDIUM

CLAIM OF PRIORITY

This application claims priority to China Patent Application No. 201710660484.6, filed on Aug. 4, 2017 and entitled "Intention Acquisition Method, Electronic Device and Computer-Readable Storage Medium", which is hereby incorporated by reference in its entirety.

TECHNICAL FIELD

This disclosure relates generally to the technical field of artificial intelligence, and more particularly relates to an intention acquisition method, an electronic device and a computer-readable storage medium.

BACKGROUND

At present, a business colleague is not a professional maintainer of knowledge base without consideration of identifiability in knowledge classification, so that adding knowledge with poor identifiability into the knowledge base may affect the whole situation. In addition, most of present customer service robots do not support multi-round dialog interaction and dialog management, or, even though they do, require manual intervention and configuration. Moreover, customized management over multi-round dialogs is required by different channels such as an online channel or a telephone channel, which makes system migration performance relatively poor.

SUMMARY

A main objective of the disclosure is to provide an intention acquisition method, an electronic device and a computer-readable storage medium, which improve migration efficiency and a human-computer interaction response speed and reduce impact on a global result.

At first, to achieve the foregoing objective, the disclosure discloses an electronic device, which includes a memory, a processor and an intention acquisition system stored on the memory and capable of running on the processor, the intention acquisition system being executed by the processor to implement the following steps of:

acquiring a text sentence of a present dialog of a user and segmenting the text sentence into multiple words through a preset word segmentation algorithm;

mapping the multiple words obtained by segmentation to preset keywords according to a synonym mode and parts of speech of the words to obtain mapped words of the text sentence;

determining an intention node most semantically approximate to the mapped words in a preset knowledge graph;

performing semantic supplementing on the most semantically approximate intention node according to a preset supplementing manner to obtain a supplemented intention node;

if the supplemented intention node is an egress node in an intention node layer, acquiring detailed intention information associated with the supplemented intention node in a specified range in a detailed intention layer of the knowledge graph according to intention information corresponding to the supplemented intention node, and determining an intention of the user according to the acquired detailed intention information; and if the supplemented intention node is not the egress node in the intention node layer, determining the intention of the user according to a preset query mode.

In addition, to achieve the foregoing objective, the disclosure also provides an intention acquisition method, which is applied to an electronic device and includes:

acquiring a text sentence of a present dialog of a user and segmenting the text sentence into multiple words through a preset word segmentation algorithm;

mapping the multiple words obtained by segmentation to preset keywords according to a synonym mode and parts of speech of the words to obtain mapped words of the text sentence;

determining an intention node most semantically approximate to the mapped words in a preset knowledge graph;

performing semantic supplementing on the most semantically approximate intention node according to a preset supplementing manner to obtain a supplemented intention node;

if the supplemented intention node is an egress node in an intention node layer, acquiring detailed intention information associated with the supplemented intention node in a specified range in a detailed intention layer of the knowledge graph according to intention information corresponding to the supplemented intention node, and determining an intention of the user according to the acquired detailed intention information; and if the supplemented intention node is not the egress node in the intention node layer, determining the intention of the user according to a preset query mode.

Furthermore, to achieve the foregoing objective, the disclosure also provides a computer-readable storage medium, which stores an intention acquisition system, the intention acquisition system being executed by at least one processor to implement the following steps of:

acquiring a text sentence of a present dialog of a user and segmenting the text sentence into multiple words through a preset word segmentation algorithm;

mapping the multiple words obtained by segmentation to preset keywords according to a synonym mode and parts of speech of the words to obtain mapped words of the text sentence;

determining an intention node most semantically approximate to the mapped words in a preset knowledge graph;

performing semantic supplementing on the most semantically approximate intention node according to a preset supplementing manner to obtain a supplemented intention node;

if the supplemented intention node is an egress node in an intention node layer, acquiring detailed intention information associated with the supplemented intention node in a specified range in a detailed intention layer of the knowledge graph according to intention information corresponding to the supplemented intention node, and determining an intention of the user according to the acquired detailed intention information; and if the supplemented intention node is not the egress node in the intention node layer, determining the intention of the user according to a preset query mode.

According to the intention acquisition method, electronic device and computer-readable storage medium disclosed in the disclosure, the intention information of the user is acquired only in the relatively small specified range, so that a human-computer interaction response may be made more quickly, and even though inaccurate knowledge exists in the knowledge base, no global impact may be brought. If the intention of the user is not so definite, the intention of the user is further determined through the intelligent query mode, so that a fully automatic flow for user intention acquisition in a server is implemented. Furthermore, conditions of different channel types are considered during semantic supplementing and intention query in the disclosure, so that the system may be continuously migrated between different channels, learning cost for migration work is reduced, it is only necessary to learn to use a migration tool, and low error rate, high migration efficiency, safety and reliability are ensured.

BRIEF DESCRIPTION OF THE ACCOMPANYING DRAWINGS

DRAWING REFERENCE SIGNS

| | |
|---|---|
| Electronic device | 2 |
| Intention acquisition system | 20 |
| Memory | 21 |
| Processor | 22 |
| Network interface | 23 |
| Semantic comprehension module | 200 |
| Word segmentation module | 201 |
| Intention acquisition module | 202 |
| Intention knowledge acquisition module | 203 |
| Training module | 204 |
| Post-processing module | 205 |
| Training data module | 206 |
| Test data module | 207 |
| Preceding text module | 208 |
| Knowledge graph module | 209 |
| Flow steps | S31-S36 |

Achievement of the objective, functional characteristics and advantages of the disclosure will further be described in combination with embodiments and with reference to the accompanying drawings.

DETAILED DESCRIPTION OF ILLUSTRATED EMBODIMENTS

For making the objective, technical solutions and advantages of the disclosure clearer, the disclosure will further be described below in combination with the accompanying drawings and embodiments in detail. It is to be understood that the specific embodiments described herein are adopted not to limit the disclosure but only to explain the disclosure. All other embodiments obtained by those of ordinary skill in the art on the basis of the embodiments in the disclosure without creative work shall fall within the scope of protection of the disclosure.

It is to be noted that descriptions involving "first", "second" and the like in the disclosure are only made for description and should not be understood to indicate or imply relative importance thereof or implicitly indicate the number of indicated technical features. Therefore, a feature defined by "first" and "second" may explicitly or implicitly indicate inclusion of at least one such feature. In addition, the technical solutions of each embodiment may be combined on the premise that the combinations may be implemented by those of ordinary skill in the art, and if the combinations of the technical solutions conflict or may not be implemented, it should be understood that the combinations of the technical solutions do not exist and also not fall within the scope of protection claimed by the disclosure.

It is further to be noted that terms "include" and "contain" or any other variant thereof in the disclosure is intended to cover nonexclusive inclusions, so that a process, method, object or device including a series of elements not only includes those elements but also includes other elements which are not listed clearly or further includes elements intrinsic to the process, the method, the object or the device. Under the condition of no more restrictions, an element defined by a statement "including a/an . . . " does not exclude existence of the same other element in a process, method, object or device including the element.

At first, the disclosure discloses an electronic device 2.

Figure 1:
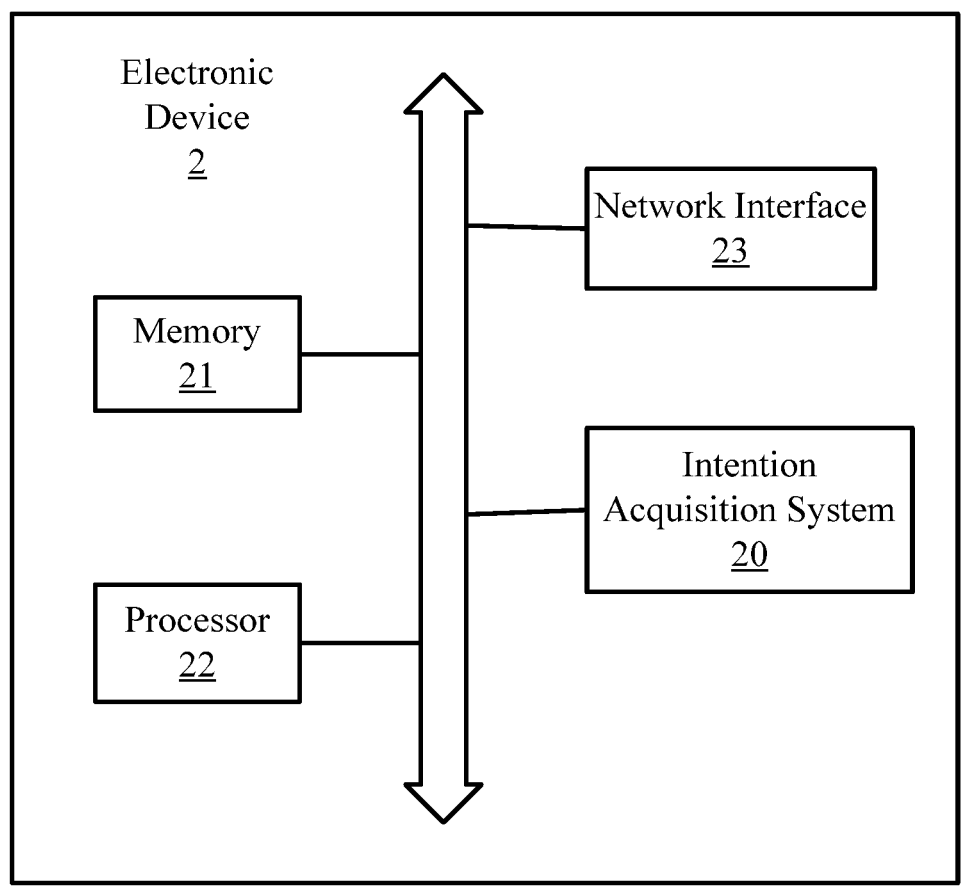
FIG. 1 is a schematic diagram of an optional hardware architecture of an electronic device according to the disclosure.

FIG. 1 is a schematic diagram of an optional hardware architecture of an electronic device according to the disclosure.

In the embodiment, the electronic device 2 may include, but not limited to, a memory 21, processor 22 and network interface 23 which may form communication connections with one another through a system bus. Herein, the electronic device 2 may be computing equipment such as a rack-mounted server, a blade server, a tower server or a cabinet server. The electronic device 2 may be an independent server and may also be a server cluster consisting of multiple servers. It is to be noted that FIG. 1 only illustrates the electronic device 2 with the components 21-23. However, it is to be understood that not all of the illustrated components are required to be implemented and, instead, more or fewer components may be implemented.

Herein, the memory 21 at least includes at least one type of readable storage medium. The readable storage medium includes a flash memory, a hard disk, a multimedia card, a card type memory (for example, a secure digital (SD) or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc and the like. In some embodiments, the memory 21 may be an internal storage unit of the electronic device 2, for example, a hard disk or an internal memory of the electronic device 2. In some other embodiments, the memory 21 may also be external storage equipment of the electronic device 2, for example, a plug-in type hard disk, smart media card (SMC), SD card and flash card configured on the electronic device 2. Of course, the memory 21 may also include both of the internal storage unit of the electronic device and the external storage equipment thereof. In the embodiment, the memory 21 is usually configured to store an operating system and various types of application software installed in the electronic device 2, for example, a program code of an intention acquisition system 20. In addition, the memory 21 may further be configured to temporally store various types of data which has been output or is to be output.

In some embodiments, the processor 22 may be a central processing unit (CPU), a controller, a microcontroller, a microprocessor or another data processing chip. The processor 22 is usually configured to control overall operations of the electronic device 2, for example, executing control and processing related to data interaction or communication of the electronic device 2. In the embodiment, the processor 22 is configured to run the program code stored in the memory 21 or process the data, for example, running the intention acquisition system 20.

The network interface 23 may include a wireless network interface or a wired network interface. The network device 23 is usually configured to establish a communication connection between the electronic device 2 and other electronic equipment. For example, the network interface 23 may be configured to connect the electronic device 2 with the other electronic equipment or client through a communication network. The communication network may be a wireless or wired network such as an intranet, the Internet, a global system of mobile communication (GSM), wideband code division multiple access (CDMA), 4th-generation (4G), 5th-generation (5G), Bluetooth and wireless fidelity (Wi-Fi).

So far, a hardware structure and functions of related equipment of the disclosure have been introduced in detail. Each embodiment of the disclosure will be disclosed below on the basis of the related equipment.

Figure 2:
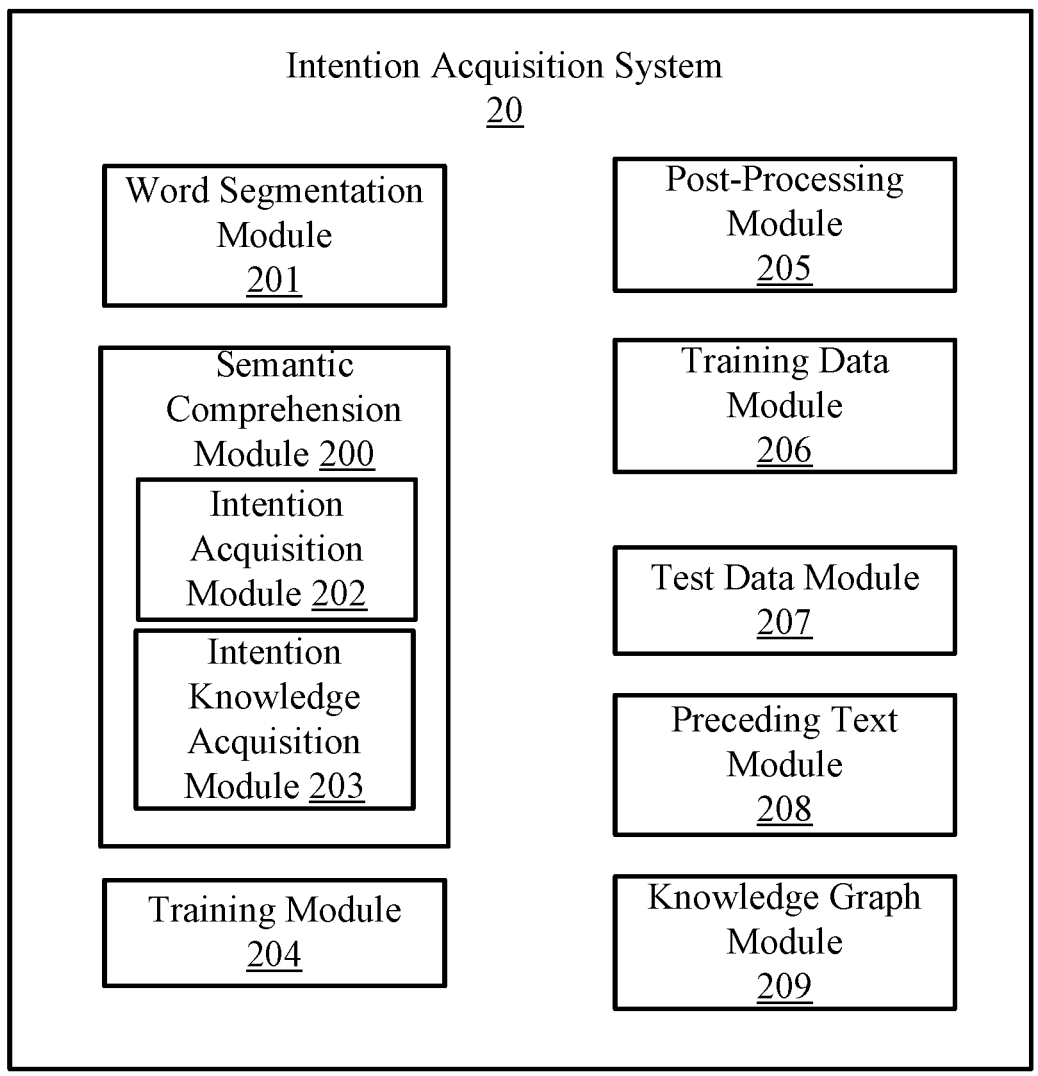
FIG. 2 is a schematic diagram of function modules of each embodiment of an intention acquisition system in an electronic device according to the disclosure.

FIG. 2 is a diagram of function modules of each embodiment of an intention acquisition system 20 in an electronic device according to the disclosure. In the embodiment, the intention acquisition system 20 may be divided into one or more modules, and the one or more modules are stored in the memory 21 and executed by one or more processors (the processor 22 in the embodiment) to implement the disclosure. For example, the intention acquisition system 20 shown in FIG. 2 may be divided into a word segmentation module 201, an intention acquisition module 202, an intention knowledge acquisition module 203, a training module 204, a post-processing module 205, a training data module 206, a test data module 207, a preceding text module 208 and a knowledge graph module 209. The intention acquisition module 202 and the intention knowledge acquisition module 203 may be combined into a semantic comprehension module 200. The function modules in the disclosure refer to a series of computer program instruction segments capable of realizing specific functions and are more suitable than programs to describe an execution process of the intention acquisition system 20 in the electronic device 2. The functions of each function module 201-209 will be described below in detail.

It is to be noted that modules realizing a core function for the objective of the disclosure include the word segmentation module 201 and the intention acquisition module 202 and the other modules 203-209 supplement and further improve the core function of the disclosure.

The word segmentation module 201 is configured to acquire a text sentence of a present dialog (i.e., a present-round dialog) of a user and segment the text sentence into multiple words through a preset word segmentation algorithm. Preferably, if a content of the present dialog of the user is voice information, the voice information of the user is converted into a text sentence at first through a voice recognition algorithm (for example, a MATLAB algorithm or a dynamic time warping (DTW) algorithm).

The intention acquisition module 102 is configured to map the multiple words obtained by segmentation to preset keywords according to a synonym mode and parts of speech of the words to obtain mapped words of the text sentence. For example, if the text sentence of the present dialog of the user is: inquire the credit card statement, the multiple words obtained by segmentation include: inquire, credit card and statement. If the preset keywords include: query, credit card and statement, since the part of speech of the word "inquire" is the same as the part of speech of the keyword "query" (both of them are verbs) and they are semantically approximate, the word "inquire" is mapped to the keyword "query", similarly, the word "credit card" is mapped to the keyword "credit card" and the word "statement" is mapped to the keyword "statement". That is, the mapped words of the text sentence include: query, credit card and statement.

The intention acquisition module 202 is further configured to determine an intention node most semantically approximate to the mapped words in a preset knowledge graph.

Preferably, in the embodiment, the preset knowledge graph includes, but not limited to, an intention node layer (or called a knowledge system layer and a knowledge node layer), a detailed intention layer and a knowledge base layer. Herein, the intention node layer includes nodes of multiple levels consisting of word elements of different types, the detailed intention layer stores detailed intention information associated with egress nodes (or called "last-level nodes") of the intention node layer, and the knowledge base layer stores detailed intention information screened from the detailed intention layer and records the screened detailed intention information as specific knowledge.

Preferably, in the embodiment, the word elements of different types include, but not limited to, a series element (for example, credit card), a target element (for example, statement or card body) and an action element (for example, query). For example, referring to FIG. 4, in the embodiment, the intention node layer includes nodes of three levels: first-level nodes consisting of series elements (for example, a credit card node), second-level nodes consisting of target elements (for example, a statement node or a card body node) and third-level nodes consisting of action elements (for example, a query node or an additional sending node). "YES" and "NO" marked in the brackets are configured to record whether a certain node is an egress node or not, "YES" represents that it is an egress node and "NO" represents that it is a non-egress node.

Figure 4:
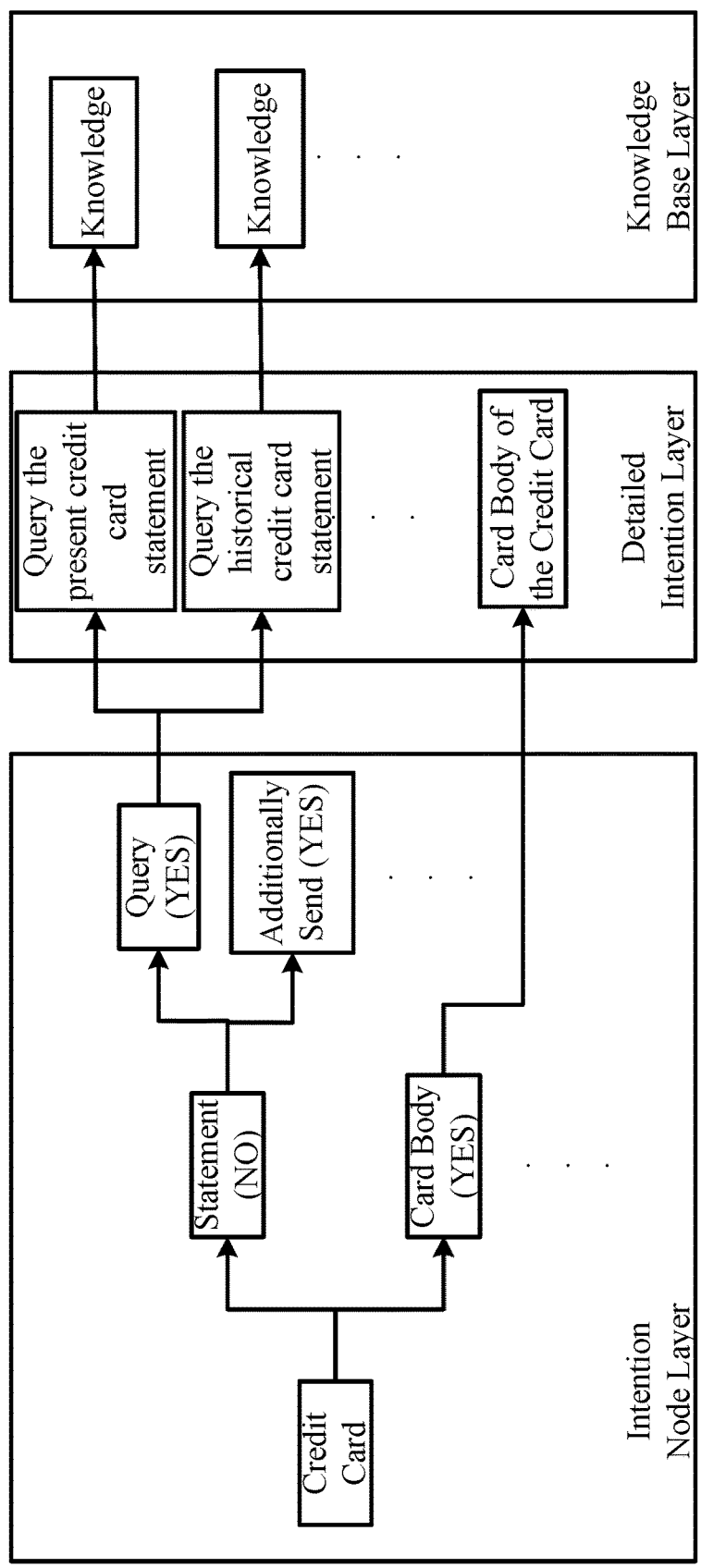
FIG. 4 is an example diagram of a preset knowledge graph according to the disclosure.

It is to be noted that, in the embodiment, that the intention node layer includes the nodes of the three levels does not refer to that all the egress nodes are third-level nodes and some egress nodes may be second-level nodes. For example, the card body node (second-level node) in FIG. 4 is an egress node. Furthermore, in the embodiment, according to different application environments, the intention node layer may also include nodes of four levels or nodes of other numbers of levels set according to different application environments.

Furthermore, referring to FIG. 4, intention information output by the query node (egress node) is "query the present credit card statement" and "query the historical credit card statement", and intention information output by the card body node (egress node) is "credit card body". Correspondingly, detailed intention information in the detailed intention layer includes: "query the present credit card statement, query the historical credit card statement and credit card body" and the like. Meaningful detailed intention information "query the present credit card statement and query the historical credit card statement" is screened from the detailed intention layer (meaningless detailed intention information "credit card body" is rejected), and the screened meaningful detailed intention information is stored in the knowledge base layer as specific knowledge.

Figure 5:
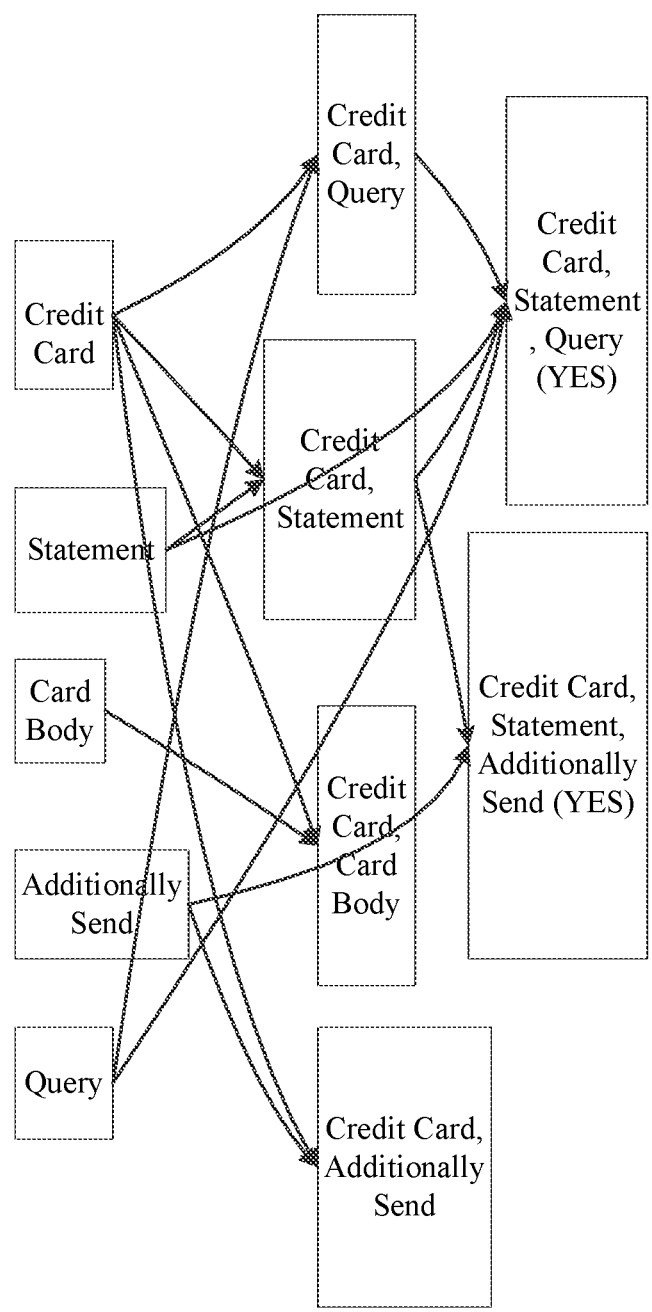
FIG. 5 is an example diagram of semantic combinations of words of an intention node layer in the knowledge graph in FIG. 4.
Figure 6:
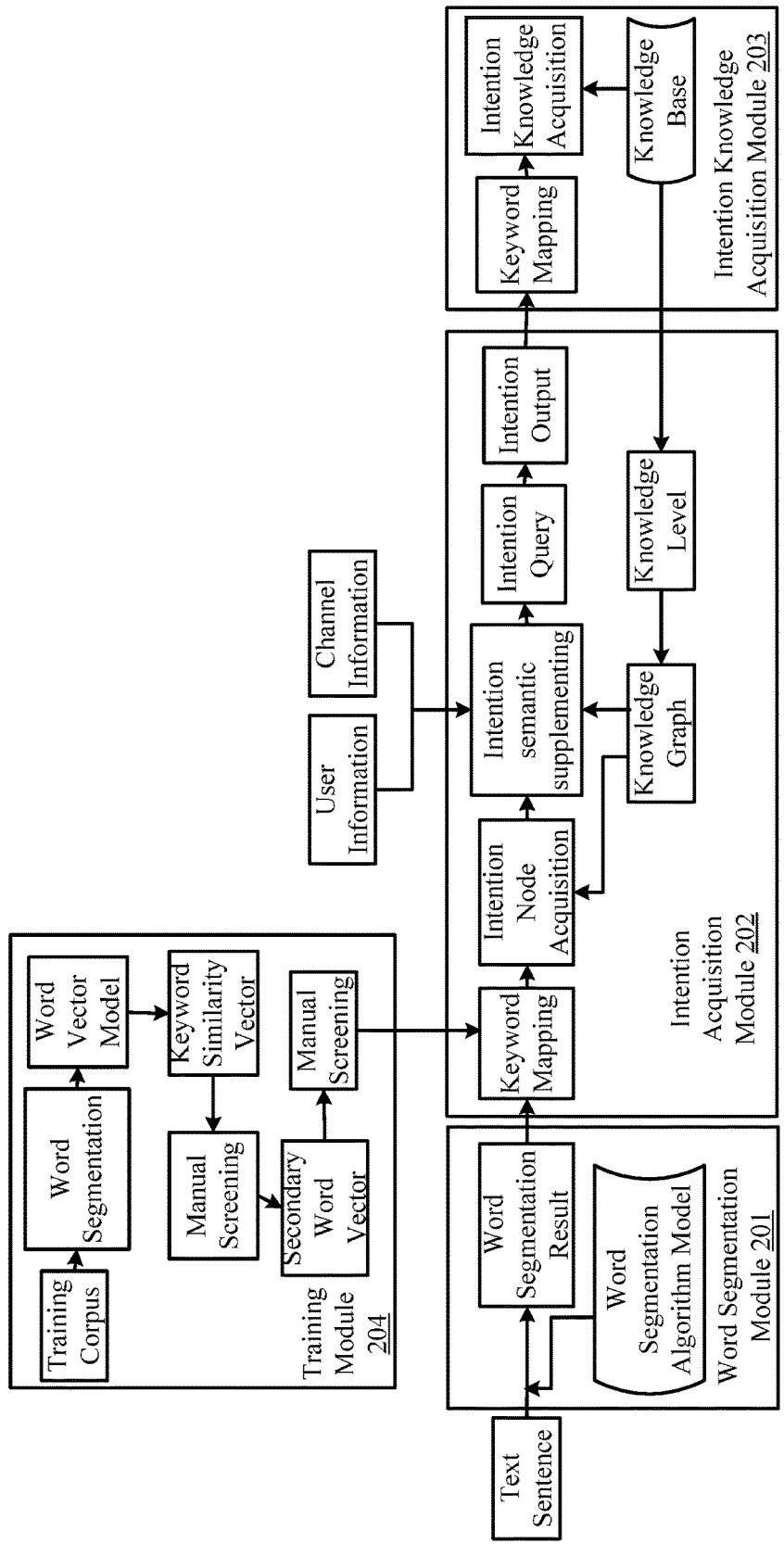
FIG. 6 is an implementation architecture schematic diagram according to the disclosure.
Figure 7:
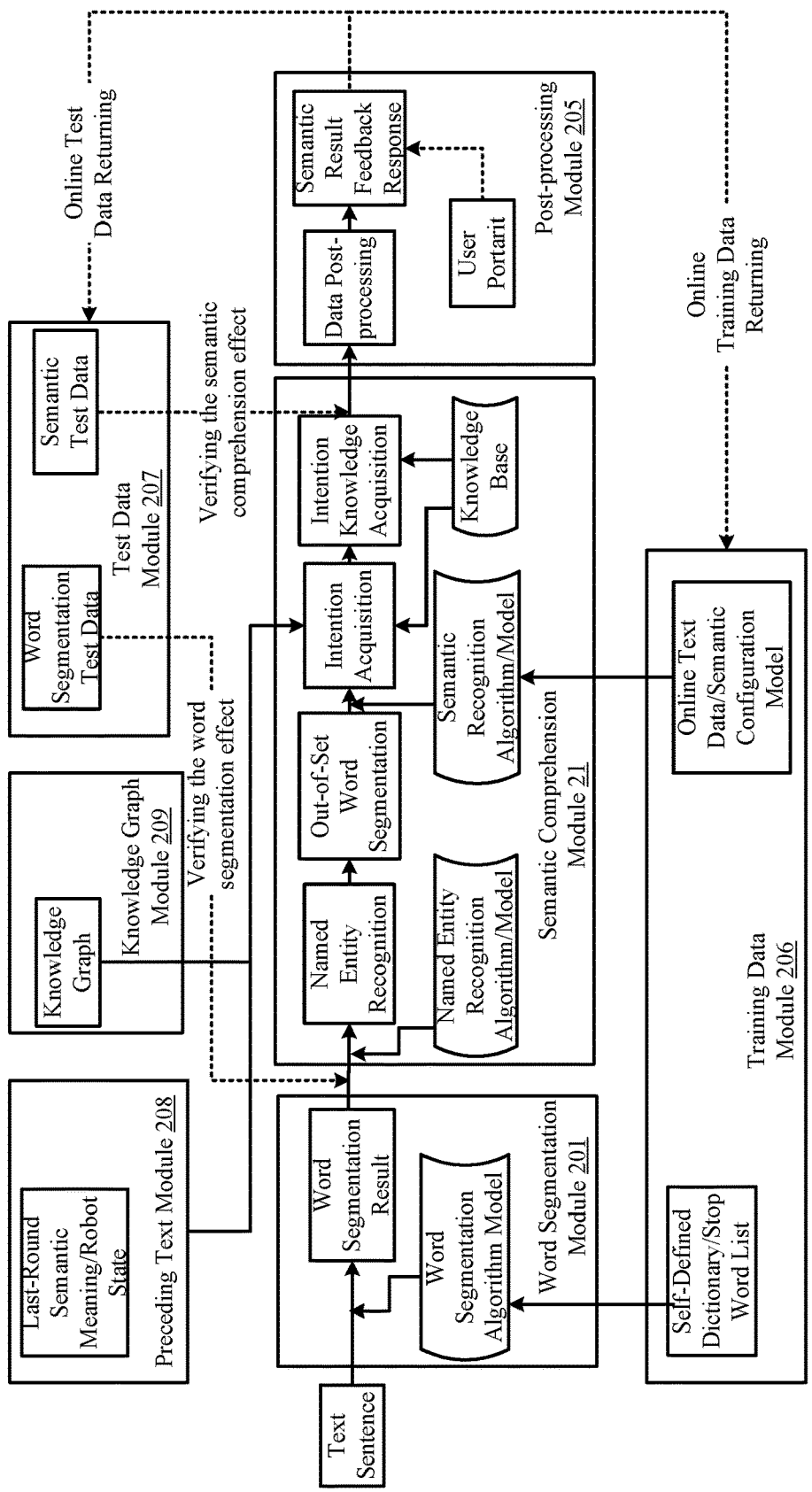
FIG. 7 is a planned architecture schematic diagram according to the disclosure.

Preferably, in the embodiment, the step that the most semantically approximate intention node is determined includes that: the intention node layer in the knowledge graph is traversed and the intention node most semantically approximate to the mapped words is determined in the intention node layer according to the synonym mode and the parts of speech of the words. For example, referring to FIG. 5, different semantic combinations of the words of all the nodes in the intention node layer in FIG. 4 are obtained to obtain intention information of all the egress nodes in the intention node layer. For example, the intention information of the query node (egress node) is: "credit card, statement and query (YES)" and intention information of the additional sending node is: "credit card, statement and "additionally send (YES)". "YES" and "NO" marked in the brackets are configured to record whether a certain node is an egress node or not, "YES" represents that it is an egress node and "NO" represents that it is a non-egress node.

The intention acquisition module 202 is further configured to perform semantic supplementing on the most semantically approximate intention node according to a preset supplementing manner to obtain a supplemented intention node.

In the embodiment, the preset supplementing manner includes, but not limited to, a channel information supplementing manner, a user information supplementing manner and a knowledge graph information supplementing manner. A specific supplementing process may be implemented in one of the supplementing manners and may also be implemented in multiple supplementing manners. There are no limits made herein. In the embodiment, channel information includes credit card channel information (representing that the user has the present dialog through a contact channel of a credit card center), a property and casualty channel information (representing that the user has the present dialog through a contact channel of a property and casualty sales center) and a telephone channel information (representing that the user has the present dialog through a self-help customer service telephone channel). The user information includes an account type of the user, an operation right of an account of each type and the like. The knowledge graph information refers to FIG. 4 and will not be elaborated herein.

If the supplementing manner is the channel information supplementing manner, missing channel information is supplemented in the most approximate intention node. For example, if the most approximate intention node is "query and statement" and the user has the present dialog through the credit card contact channel, channel information "credit card" is supplemented in the most approximate intention node "query and statement" to obtain the supplemented intention node "query, credit card and statement".

If the supplementing manner is the user information supplementing manner, missing user information is supplemented in the most approximate intention node. For example, if the most approximate intention node is "query and statement" and the account type in the user information only includes credit card, user information "credit card" is supplemented in the most approximate intention node "query and statement" to obtain the supplemented intention node "query, credit card and statement".

If the supplementing manner is the knowledge graph information supplementing manner, all element information corresponding to a node path where the most approximate intention node is located is determined in the intention node layer of the knowledge graph, and missing element information (for example, series element information) is supplemented in the most approximate intention node. For example, if the most approximate intention node is "card body" and all element information corresponding to a node path of the card body includes "credit card and card body", missing element information "credit card" is supplemented in the most approximate intention node "card body" to obtain the supplemented intention node "credit card and card body".

The intention acquisition module 202 is further configured to, if the supplemented intention node is an egress node in an intention node layer, acquire detailed intention information associated with the supplemented intention node in a specified range in a detailed intention layer of the knowledge graph according to intention information corresponding to the supplemented intention node and determine an intention of the user according to the acquired detailed intention information, namely searching knowledge under the supplemented intention node according to corpus generating the intention of the user to obtain corresponding knowledge. It is to be noted that, if there is only one piece of knowledge under the supplemented intention node, the knowledge is directly returned as the intention information of the user.

For example, referring to FIG. 4, if the supplemented intention node is the query node (egress node), the detailed intention information associated with the query node in the detailed intention layer includes "query the present credit card statement and query the historical credit card statement", it is determined that the intention of the user is to query the present credit card statement or query the historical credit card statement, and the determined intention of the user is output to a display unit of the electronic device or user equipment for final confirmation of the user.

In the disclosure, since the intention information of the user is acquired only in a relatively small specified range (small range associated with the egress node) and the detailed intention layer may be avoided to be searched for the intention information of the user, a human-computer interaction response may be made more quickly in the disclosure. In addition, since only the relatively small range is searched, even though inaccurate knowledge exists in the knowledge base, no global impact may be brought.

The intention acquisition module 202 is further configured to, if the supplemented intention node is not the egress node (non-egress node) in the intention node layer, determine the intention of the user according to a preset query mode. In the embodiment, the preset query mode includes, but not limited to, an enumeration mode and an element mode (or called an "open query mode"). The enumeration mode refers to determining different enumeration strategies according to different channel types and outputting corresponding enumerated prompting information according to different enumeration strategies. The element mode refers to outputting corresponding element prompting information according to missing element information in the supplemented intention node. For example, the enumerated prompting information or the element prompting information is output to the display unit of the electronic device or the user equipment. In the disclosure, the intention of the user may be determined by adopting a single query mode and the intention of the user may also be determined in a manner of combining multiple query modes.

Preferably, in another embodiment, if the preset query mode is the enumeration mode and the channel type includes a credit card channel (for example, online credit card query), a property and casualty channel (for example, online property and casualty consultation) and a telephone channel (for example, a bank customer service telephone). If the channel type is the credit card channel, a first predetermined amount of (for example, at most 6) enumerated prompting information is output; if the channel type is the property and casualty channel, a second predetermined amount (for example, at most 4) enumerated prompting information is output; and if the channel type is the telephone channel, a third predetermined amount (for example, at most 2) of enumerated prompting information is output.

For example, when the channel type is the telephone channel and the supplemented intention node is the statement node (non-egress node), the output numeration prompting information may be:
query the credit card statement or
additionally send the credit card state.

When the channel type is the credit card channel and the supplemented intention node is the credit card node (non-egress node), the output numeration prompting information may be:
query the credit card statement,
additionally send the credit card statement or
credit card body.

Preferably, in another embodiment, if the preset query mode is the element mode, the element mode refers to outputting the corresponding element prompting information according to the missing element information in the supplemented intention node. For example, if the supplemented intention node is the statement node and missing element information in the statement node includes an action element information (for example, query or additionally send), the output element prompting information may be: which operation will be executed on the credit card statement.

In the disclosure, when the intention of the user is not so definite (that is, the supplemented intention node is not an egress node in the intention node layer), the intention of the user is further determined through the preset query mode (enumeration mode or element mode), so that intervention of service staff in a user intention acquisition process in a server is avoided, and a fully automatic flow for user intention acquisition in the server is implemented.

Furthermore, in the disclosure, conditions of different channel types are considered during when the intention of the user is further queried (different enumeration strategies are determined according to different channel types and the corresponding enumerated prompting information is output), and the supplementing manners for different channel types (the supplementing manner for the credit card channel, the supplementing manner for the property and casualty channel and the supplementing manner for the telephone channel) are also considered during semantic supplementing of the most approximate intention node, so that the system may be continuously migrated between different channels, learning cost for migration work is reduced, it is only necessary to learn to use a migration tool, and low error rate, high migration efficiency, safety and reliability are ensured.

It is to be noted that, in another embodiment, the intention acquisition module 202 is further configured to, if the supplemented intention node is not the egress node in the intention node layer, output intention acquisition failure information to the display unit of the electronic device or the user equipment and prompt the user to have another dialog.

Furthermore, in another embodiment, the semantic supplementing step may be skipped. Under this condition, the intention acquisition module 202 is further configured to, if the determined intention node (i.e., the most approximate intention node) is the egress node in the intention node layer, acquire the detailed intention information associated with the determined intention node in the specified range in the detailed intention layer of the knowledge graph according to the intention information corresponding to the determined intention node and determine the intention of the user according to the acquired detailed intention information, namely searching the knowledge under the determined intention node according to the corpus generating the intention of the user to obtain the corresponding knowledge.

Furthermore, if the semantic supplementing step is skipped, under this condition, the intention acquisition module 202 is further configured to, if the determined intention node is not the egress node in the intention node layer, determine the intention of the user according to the preset query mode, or output the intention acquisition failure information to the display unit of the electronic device or the user equipment and prompt the user to have another dialog.

Preferably, in another embodiment, the intention acquisition system 20 further includes the intention knowledge acquisition module 203, and the intention knowledge acquisition module 203 is configured to:

output the determined intention of the user and store the determined intention of the user to the knowledge base layer of the knowledge graph to acquire intention knowledge of the user. Specifically, the system calculates a cosine value of an included angle between a word vector in the determined intention of the user and a word vector predetermined in the knowledge base layer to obtain a similarity value (similarity matching) between the word vector in the determined intention of the user and the word vector predetermined in the knowledge base layer. If the similarity value is higher than a preset threshold value (80%), the determined intention of the user is stored to the knowledge base layer of the knowledge graph.

Preferably, in another embodiment, the intention acquisition system 20 further includes the training module 204, and the training module 204 is configured to sequentially perform a word segmentation operation, a word vector model operation, an operation for word vectors similar to the keywords, primary manual screening, a secondary word vector operation and secondary manual screening on training corpus to obtain training data for keyword mapping.

Preferably, in another embodiment, the semantic comprehension module 200 is further configured to:

recognize a specific word (for example, credit card and statement) from the multiple words obtained by segmentation according to a preset named entity recognition algorithm (for example, a deep neural network-based named entity recognition algorithm); and perform keyword extension for the recognized specific word according to a preset out-of-set word detection algorithm (for example, a two-stage out-of-set word query algorithm and a word lattice correction algorithm) and add a word obtained by extension into the multiple words obtained by segmentation.

Preferably, in another embodiment, the intention acquisition system 20 further includes the post-processing module 205, and the post-processing module 205 is configured to perform different processing on the acquired user intention knowledge according to user portrait information (or user attribute information and the like) and make a feedback response according to a semantic result. In the embodiment, the user attribute information includes, but not limited to, a user sex (male and female), a user age, a user level and the like. For example, if the user attribute information is a very important person (VIP) user, query about credit card statement information of a relatively long time (for example, 100 days) is provided for the user, or when the intention information of the user may not be acquired, automatic switching to manual service is implemented. If the user attribute information is a non-VIP user, query about credit card statement information of a relatively short time (for example, 30 days) is provided for the user, or when the intention information of the user may not be acquired, the user is prompted to have another dialog and the like.

Preferably, in another embodiment, the intention acquisition system 20 further includes the training data module 206, and the training data module 206 is configured to store a self-defined dictionary and stop word list for word segmentation training and store an online text data and semantic configuration mode for semantic recognition training.

Preferably, in another embodiment, the intention acquisition system 20 further includes the test data module 207, and the test data module 207 is configured to:

store word segmentation test data for verifying a word segmentation effect and store semantic test data for verifying a semantic comprehension effect;

verify an effect of a word segmentation result by use of preset word segmentation test data and a word segmentation analysis algorithm (for example, an algorithm for calculating accuracy, a recall rate and an F value); and verify a semantic comprehension effect of the acquired user intention knowledge by use of preset semantic test data and a semantic analysis algorithm (for example, a single-step algorithm), and store the semantic comprehension effect to the knowledge base layer.

Preferably, in another embodiment, the intention acquisition system 20 further includes the preceding text module 208, and the preceding text module 208 is configured to, when the intention of the present dialog (i.e., the present-round dialog) of the user is acquired, record semantic information (i.e., last-round semantic meaning) of a last-round dialog, state information of the electronic device (for example, robot state) and the like.

Preferably, in another embodiment, the intention acquisition system 20 further includes the knowledge graph module 209, and the knowledge graph module 209 is configured to store the preset knowledge graph.

Through the above function modules 201-209 of the intention acquisition system 20 disclosed in the disclosure, the intention information of the user is acquired only in the relatively small specified range, so that a human-computer interaction response may be made more quickly, and even though inaccurate knowledge exists in the knowledge base, no global impact may be brought. If the intention of the user is not so definite, the intention of the user is further determined through the intelligent query mode, so that the fully automatic flow for user intention acquisition in the server is implemented. Furthermore, the conditions of different channel types are considered during semantic supplementing and intention query in the disclosure, so that the system may be continuously migrated between different channels, learning cost for migration work is reduced, it is only necessary to learn to use the migration tool, and low error rate, high migration efficiency, safety and reliability are ensured.

In addition, the disclosure also discloses an intention acquisition method.

Figure 3:
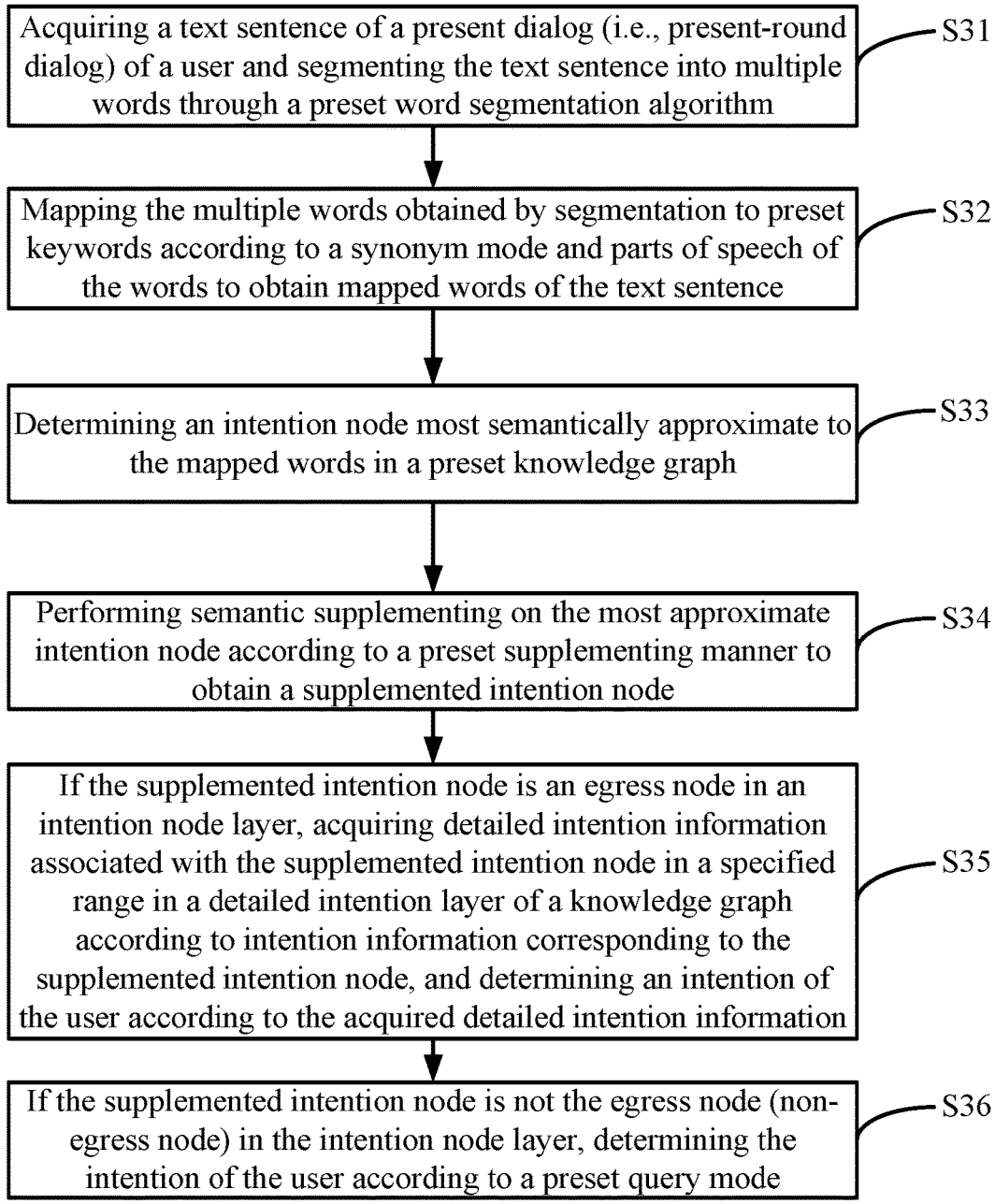
FIG. 3 is an implementation flowchart of an embodiment of an intention acquisition method according to the disclosure.

FIG. 3 is an implementation flowchart of an embodiment of an intention acquisition method according to the disclosure. In the embodiment, an execution step of steps in the flowchart shown in FIG. 3 may be changed according to different requirements and some steps may be skipped.

In S31, a text sentence of a present dialog (i.e., a present-round dialog) of a user is acquired, and the text sentence is segmented into multiple words through a preset word segmentation algorithm. Preferably, if a content of the present dialog of the user is voice information, the voice information of the user is converted into a text sentence at first through a voice recognition algorithm (for example, a MATLAB algorithm or a DTW algorithm).

In S32, the multiple words obtained by segmentation are mapped to preset keywords according to a synonym mode and parts of speech of the words to obtain mapped words of the text sentence. For example, if the text sentence of the present dialog of the user is: inquire the credit card statement, the multiple words obtained by segmentation include: inquire, credit card and statement. If the preset keywords include: query, credit card and statement, since the part of speech of the word "inquire" is the same as the part of speech of the keyword "query" (both of them are verbs) and they are semantically approximate, the word "inquire" is mapped to the keyword "query", similarly, the word "credit card" is mapped to the keyword "credit card" and the word "statement" is mapped to the keyword "statement". That is, the mapped words of the text sentence include: query, credit card and statement.

In S33, an intention node most semantically approximate to the mapped words in a preset knowledge graph is determined.

Preferably, in the embodiment, the preset knowledge graph includes, but not limited to, an intention node layer (or called a knowledge system layer and a knowledge node layer), a detailed intention layer and a knowledge base layer. Herein, the intention node layer includes nodes of multiple levels consisting of word elements of different types, the detailed intention layer stores detailed intention information associated with egress nodes (or called "last-level nodes") of the intention node layer, and the knowledge base layer stores detailed intention information screened from the detailed intention layer and records the screened detailed intention information as specific knowledge.

Preferably, in the embodiment, the word elements of different types include, but not limited to, a series element (for example, credit card), a target element (for example, statement or card body) and an action element (for example, query). For example, referring to FIG. 4, in the embodiment, the intention node layer includes nodes of three levels: first-level nodes consisting of series elements (for example, a credit card node), second-level nodes consisting of target elements (for example, a statement node or a card body node) and third-level nodes consisting of action elements (for example, a query node or an additional sending node). "YES" and "NO" marked in the brackets are configured to record whether a certain node is an egress node or not, "YES" represents that it is an egress node and "NO" represents that it is a non-egress node.

It is to be noted that, in the embodiment, that the intention node layer includes the nodes of the three levels does not refer to that all the egress nodes are third-level nodes and some egress nodes may be second-level nodes. For example, the card body node (second-level node) in FIG. 4 is an egress node. Furthermore, in the embodiment, according to different application environments, the intention node layer may also include nodes of four levels or nodes of other numbers of levels set according to different application environments.

Furthermore, referring to FIG. 4, intention information output by the query node (egress node) is "query the present credit card statement" and "query the historical credit card statement", and intention information output by the card body node (egress node) is "credit card body". Correspondingly, detailed intention information in the detailed intention layer includes: "query the present credit card statement, query the historical credit card statement and credit card body" and the like. Meaningful detailed intention information "query the present credit card statement and query the historical credit card statement" is screened from the detailed intention layer (meaningless detailed intention information "credit card body" is rejected), and the screened meaningful detailed intention information is stored in the knowledge base layer as specific knowledge.

Preferably, in the embodiment, the step that the most semantically approximate intention node is determined includes that: the intention node layer in the knowledge graph is traversed and the intention node most semantically approximate to the mapped words is determined in the intention node layer according to the synonym mode and the parts of speech of the words. For example, referring to FIG. 5, different semantic combinations of the words of all the nodes in the intention node layer in FIG. 4 are obtained to obtain intention information of all the egress nodes in the intention node layer. For example, the intention information of the query node (egress node) is: "credit card, statement and query (YES)" and intention information of the additional sending node is: "credit card, statement and "additionally send (YES)". "YES" and "NO" marked in the brackets are configured to record whether a certain node is an egress node or not, "YES" represents that it is an egress node and "NO" represents that it is a non-egress node.

In S34, semantic supplementing is performed on the most semantically approximate intention node according to a preset supplementing manner to obtain a supplemented intention node.

In the embodiment, the preset supplementing manner includes, but not limited to, a channel information supplementing manner, a user information supplementing manner and a knowledge graph information supplementing manner. A specific supplementing process may be implemented in one of the supplementing manners and may also be implemented in multiple supplementing manners. There are no limits made herein. In the embodiment, channel information includes credit card channel information (representing that the user has the present dialog through a contact channel of a credit card center), a property and casualty channel information (representing that the user has the present dialog through a contact channel of a property and casualty sales center) and a telephone channel information (representing that the user has the present dialog through a self-help customer service telephone channel). The user information includes an account type of the user, an operation right of an account of each type and the like. The knowledge graph information refers to FIG. 4 and will not be elaborated herein.

If the supplementing manner is the channel information supplementing manner, missing channel information is supplemented in the most approximate intention node. For example, if the most approximate intention node is "query and statement" and the user has the present dialog through the credit card contact channel, channel information "credit card" is supplemented in the most approximate intention node "query and statement" to obtain the supplemented intention node "query, credit card and statement".

If the supplementing manner is the user information supplementing manner, missing user information is supplemented in the most approximate intention node. For example, if the most approximate intention node is "query and statement" and the account type in the user information only includes credit card, user information "credit card" is supplemented in the most approximate intention node "query and statement" to obtain the supplemented intention node "query, credit card and statement".

If the supplementing manner is the knowledge graph information supplementing manner, all element information corresponding to a node path where the most approximate intention node is located is determined in the intention node layer of the knowledge graph, and missing element information (for example, series element information) is supplemented in the most approximate intention node. For example, if the most approximate intention node is "card body" and all element information corresponding to a node path of the card includes "credit card and card body", missing element information "credit card" is supplemented in the most approximate intention node "card body" to obtain the supplemented intention node "credit card and card body".

In S35, if the supplemented intention node is an egress node in an intention node layer, detailed intention information associated with the supplemented intention node is acquired in a specified range in a detailed intention layer of the knowledge graph according to intention information corresponding to the supplemented intention node, and an intention of the user is determined according to the acquired detailed intention information, namely knowledge under the supplemented intention node is searched according to corpus generating the intention of the user to obtain corresponding knowledge. It is to be noted that, if there is only one piece of knowledge under the supplemented intention node, the knowledge is directly returned as the intention information of the user.

For example, referring to FIG. 4, if the supplemented intention node is the query node (egress node), the detailed intention information associated with the query node in the detailed intention layer includes "query the present credit card statement and query the historical credit card statement", it is determined that the intention of the user is to query the present credit card statement or query the historical credit card statement, and the determined intention of the user is output to a display unit of an electronic device or user equipment for final confirmation of the user.

In the disclosure, since the intention information of the user is acquired only in a relatively small specified range (small range associated with the egress node) and the detailed intention layer may be avoided to be searched for the intention information of the user, a human-computer interaction response may be made more quickly in the disclosure. In addition, since only the relatively small range is searched, even though inaccurate knowledge exists in the knowledge base, no global impact may be brought.

In S36, if the supplemented intention node is not the egress node (non-egress node) in the intention node layer, the intention of the user is determined according to a preset query mode. In the embodiment, the preset query mode includes, but not limited to, an enumeration mode and an element mode (or called an "open query mode"). The enumeration mode refers to determining different enumeration strategies according to different channel types and outputting corresponding enumerated prompting information according to different enumeration strategies. The element mode refers to outputting corresponding element prompting information according to missing element information in the supplemented intention node. For example, the enumerated prompting information or the element prompting information is output to the display unit of the electronic device or the user equipment. In the disclosure, the intention of the user may be determined by adopting a single query mode and the intention of the user may also be determined in a manner of combining multiple query modes.

Preferably, in another embodiment, if the preset query mode is the enumeration mode and the channel type includes a credit card channel (for example, online credit card query), a property and casualty channel (for example, online property and casualty consultation) and a telephone channel (for example, a bank customer service telephone). If the channel type is the credit card channel, a first predetermined amount of (for example, at most 6) enumerated prompting information is output; if the channel type is the property and casualty channel, a second predetermined amount (for example, at most 4) enumerated prompting information is output; and if the channel type is the telephone channel, a third predetermined amount (for example, at most 2) of enumerated prompting information is output.

For example, when the channel type is the telephone channel and the supplemented intention node is the statement node (non-egress node), the output numeration prompting information may be:
  query the credit card statement or
  additionally send the credit card state.

When the channel type is the credit card channel and the supplemented intention node is the credit card node (non-egress node), the output numeration prompting information may be:
  query the credit card statement,
  additionally send the credit card statement or
  credit card body.

Preferably, in another embodiment, if the preset query mode is the element mode, the element mode refers to outputting the corresponding element prompting information according to the missing element information in the supplemented intention node. For example, if the supplemented intention node is the statement node and missing element information in the statement node includes an action element information (for example, query or additionally send), the output element prompting information may be: which operation will be executed on the credit card statement.

In the disclosure, when the intention of the user is not so definite (that is, the supplemented intention node is not an egress node in the intention node layer), the intention of the user is further determined through the preset query mode (enumeration mode or element mode), so that intervention of service staff in a user intention acquisition process in a server is avoided, and a fully automatic flow for user intention acquisition in the server is implemented.

Furthermore, in the disclosure, conditions of different channel types are considered during when the intention of the user is further queried (different enumeration strategies are determined according to different channel types and the corresponding enumerated prompting information is output), and the supplementing manners for different channel types (the supplementing manner for the credit card channel, the supplementing manner for the property and casualty channel and the supplementing manner for the telephone channel) are also considered during semantic supplementing of the most approximate intention node, so that the system may be continuously migrated between different channels, learning cost for migration work is reduced, it is only necessary to learn to use a migration tool, and low error rate, high migration efficiency, safety and reliability are ensured.

It is to be noted that, in another embodiment, S36 may also be configured to, if the supplemented intention node is not the egress node in the intention node layer, output intention acquisition failure information to the display unit of the electronic device or the user equipment and prompt the user to have another dialog.

Furthermore, in another embodiment, S34 may also be skipped. Under this condition, S35 includes that: if the intention node determined in S33 (i.e., the most approximate intention node) is the egress node in the intention node layer, the detailed intention information associated with the determined intention node is acquired in the specified range in the detailed intention layer of the knowledge graph according to the intention information corresponding to the determined intention node, and the intention of the user is determined according to the acquired detailed intention information, namely the knowledge under the determined intention node is searched according to the corpus generating the intention of the user to obtain the corresponding knowledge.

Furthermore, if S34 is skipped, under this condition, S36 includes that: if the determined intention node is not the egress node in the intention node layer, the intention of the user is determined according to the preset query mode, or the intention acquisition failure information is output to the display unit of the electronic device or the user equipment and the user is prompted to have another dialog.

Preferably, in another embodiment, the method further includes an intention knowledge acquisition step:
  the determined intention of the user is output, and the determined intention of the user is stored to the knowledge base layer of the knowledge graph to acquire intention knowledge of the user. Specifically, the system calculates a cosine value of an included angle between a word vector in the determined intention of the user and a word vector predetermined in the knowledge base layer to obtain a similarity value (similarity matching) between the word vector in the determined intention of the user and the word vector predetermined in the knowledge base layer. If the similarity value is higher than a preset threshold value (80%), the determined intention of the user is stored to the knowledge base layer of the knowledge graph.

Preferably, in another embodiment, the method further includes a training step: a word segmentation operation, a word vector model operation, an operation for word vectors similar to the keywords, primary manual screening, a secondary word vector operation and secondary manual screening are sequentially performed on training corpus to obtain training data for keyword mapping.

Preferably, in another embodiment, after S31 and before S32, the method further includes the following steps:
  a specific word (for example, credit card and statement) is recognized from the multiple words obtained by segmentation according to a preset named entity recognition algorithm (for example, a deep neural network-based named entity recognition algorithm); and
  keyword extension for the recognized specific word is performed according to a preset out-of-set word detection algorithm (for example, a two-stage out-of-set word query algorithm and a word lattice correction algorithm), and a word obtained by extension is added into the multiple words obtained by segmentation.

Preferably, in another embodiment, the method further includes a post-processing step: different processing is performed on the acquired user intention knowledge according to user portrait information (or user attribute information and the like) and a feedback response is made according to a semantic result. In the embodiment, the user attribute information includes, but not limited to, a user sex (male and female), a user age, a user level and the like. For example, if the user attribute information is a VIP user, query about credit card statement information of a relatively long time (for example, 100 days) is provided for the user, or when the intention information of the user may not be acquired, automatic switching to manual service is implemented. If the user attribute information is a non-VIP user, query about credit card statement information of a relatively short time (for example, 30 days) is provided for the user, or when the intention information of the user may not be acquired, the user is prompted to have another dialog and the like.

Preferably, in another embodiment, the method further includes a training data step: a self-defined dictionary for word segmentation training and a stop word list are stored, and an online text data and semantic configuration mode for semantic recognition training are stored.

Preferably, in another embodiment, the method further includes a test data step:

word segmentation test data for verifying a word segmentation effect is stored, and semantic test data for verifying a semantic comprehension effect is stored;

an effect of a word segmentation result is verified by use of preset word segmentation test data and a word segmentation analysis algorithm (for example, an algorithm for calculating accuracy, a recall rate and an F value); and a semantic comprehension effect of the acquired user intention knowledge is verified by use of preset semantic test data and a semantic analysis algorithm (for example, a single-step algorithm), and the semantic comprehension effect is stored to the knowledge base layer.

Preferably, in another embodiment, the method further includes a preceding text recording step: when the intention of the present dialog (i.e., the present-round dialog) of the user is acquired, semantic information (i.e., last-round semantic meaning) of a last-round dialog, state information of the electronic device (for example, robot state) and the like are recorded.

Through the above steps S31-S36 of the intention acquisition method disclosed in the disclosure, the intention information of the user is acquired only in the relatively small specified range, so that a human-computer interaction response may be made more quickly, and even though inaccurate knowledge exists in the knowledge base, no global impact may be brought. If the intention of the user is not so definite, the intention of the user is further determined through the intelligent query mode, so that a fully automatic flow for user intention acquisition in a server is implemented. Furthermore, the conditions of different channel types are considered during semantic supplementing and intention query in the disclosure, so that the system may be continuously migrated between different channels, learning cost for migration work is reduced, it is only necessary to learn to use the migration tool, and low error rate, high migration efficiency, safety and reliability are ensured.

Furthermore, to achieve the foregoing objective, the disclosure also provides a computer-readable storage medium (for example, a ROM/RAM, a magnetic disk and an optical disc), which stores an intention acquisition system 20, the intention acquisition system being executed by at least one processor 22 to enable the at least one processor to execute the steps of the foregoing intention acquisition method.

By the description of the foregoing embodiments, it will be evident to those skilled in the art that the methods of the embodiments can be implemented by means of software plus the necessary general-purpose hardware platform; and they can of course be implemented by hardware, but in many cases the former will be more advantageous. Based on such an understanding, the essential technical solution of the disclosure, or the portion that contributes to the prior art may be embodied as software products. Computer software products can be stored in a storage medium (e.g., a ROM/RAM, a magnetic disk, an optical disc), including multiple instructions that, when executed, can cause a terminal device (e.g., a mobile phone, a computer, a server, an air conditioner, a network device), to execute the methods described in the various embodiments of the disclosure.

The preferred embodiments of the disclosure are described above in combination with the accompanying drawings and not thus intended to limit the scope of the disclosure. The foregoing numbering of the embodiments of the disclosure is intended for description only, and is not indicative of the pros and cons of these embodiments. In addition, although a logical sequence is shown in the flowchart, in some cases, the shown or described steps may be executed in a sequence different from that described here.

Those skilled in the art may adopt various transformed solutions to implement the disclosure without departing from the scope and essence of the disclosure. For example, features in an embodiment may be used for another embodiment to obtain another embodiment. Any equivalent configurational or flow transformations that are made taking advantage of the disclosure and that are used directly or indirectly in any other related technical field shall all fall in the scope of protection of the disclosure.

What is claimed is:

1. An electronic device, comprising a memory, a processor and an intention acquisition system stored on the memory and capable of running on the processor, the intention acquisition system being executed by the processor to implement the following steps of:

acquiring a text sentence of a present dialog of a user and segmenting the text sentence into multiple words through a preset word segmentation algorithm;

mapping the multiple words obtained by segmentation to preset keywords according to a synonym mode and parts of speech of the words to obtain mapped words of the text sentence;

determining an intention node most semantically approximate to the mapped words in a preset knowledge graph;

performing semantic supplementing on the most semantically approximate intention node according to a preset supplementing manner to obtain a supplemented intention node;

if the supplemented intention node is an egress node of an intention node layer in the knowledge graph, acquiring detailed intention information associated with the supplemented intention node in a specified range in a detailed intention layer of the knowledge graph according to intention information corresponding to the supplemented intention node, and determining an intention of the user according to the acquired detailed intention information; and if the supplemented intention node is not the egress node of the intention node layer, determining the intention of the user according to a preset query mode.

2. The electronic device of claim 1, wherein the preset knowledge graph comprises the intention node layer, the detailed intention layer and a knowledge base layer, the intention node layer comprises nodes of multiple levels consisting of word elements of different types, the detailed intention layer stores detailed intention information associated with egress nodes of the intention node layer, and the knowledge base layer stores detailed intention information screened from the detailed intention layer and records the screened detailed intention information as specific knowledge.

3. The electronic device of claim 2, wherein the word elements of different types comprise a series element, a target element and an action element, and the intention node layer comprises nodes of three levels: first-level nodes consisting of series elements, second-level nodes consisting of target elements and third-level nodes consisting of action elements.

4. The electronic device of claim 2, wherein the preset supplementing manner comprises a channel information supplementing manner, a user information supplementing manner and a knowledge graph information supplementing manner, channel information comprises credit card channel information, property and casualty channel information and telephone channel information, and user information comprises an account type of the user and an operation right of an account of each type.

5. The electronic device of claim 4, wherein performing semantic supplementing on the most approximate intention node according to the preset supplementing manner comprises:
   if the supplementing manner is the channel information supplementing manner, supplementing missing channel information in the most approximate intention node;
   if the supplementing manner is the user information supplementing manner, supplementing missing user information in the most approximate intention node; and
   if the supplementing manner is the knowledge graph information supplementing manner, determining all element information corresponding to a node path where the most approximate intention node is located in the intention node layer of the knowledge graph, and supplementing missing element information in the most approximate intention node.

6. The electronic device of claim 4, wherein the preset query mode comprises an enumeration mode and an element mode, the enumeration mode refers to determining different enumeration strategies according to different channel types and outputting corresponding enumerated prompting information according to different enumeration strategies, and the element mode refers to outputting corresponding element prompting information according to missing element information in the supplemented intention node.

7. The electronic device of claim 6, wherein determining the intention of the user according to the preset query mode comprises:
   if the preset query mode is the enumeration mode and the channel type is a credit card channel, outputting a first predetermined amount of enumerated prompting information;
   if the preset query mode is the enumeration mode and the channel type is a property and casualty channel, outputting a second predetermined amount of enumerated prompting information; and
   if the preset query mode is the enumeration mode and the channel type is a telephone channel, outputting a third predetermined amount of enumerated prompting information.

8. An intention acquisition method, applied to an electronic device and comprising:
   acquiring a text sentence of a present dialog of a user and segmenting the text sentence into multiple words through a preset word segmentation algorithm;
   mapping the multiple words obtained by segmentation to preset keywords according to a synonym mode and parts of speech of the words to obtain mapped words of the text sentence;
   determining an intention node most semantically approximate to the mapped words in a preset knowledge graph;
   performing semantic supplementing on the most semantically approximate intention node according to a preset supplementing manner to obtain a supplemented intention node;
   if the supplemented intention node is an egress node of an intention node layer in the knowledge graph, acquiring detailed intention information associated with the supplemented intention node in a specified range in a detailed intention layer of the knowledge graph according to intention information corresponding to the supplemented intention node, and determining an intention of the user according to the acquired detailed intention information; and
   if the supplemented intention node is not the egress node of the intention node layer, determining the intention of the user according to a preset query mode.

9. The intention acquisition method of claim 8, wherein the preset knowledge graph comprises the intention node layer, the detailed intention layer and a knowledge base layer, the intention node layer comprises nodes of multiple levels consisting of word elements of different types, the detailed intention layer stores detailed intention information associated with egress nodes of the intention node layer, and the knowledge base layer stores detailed intention information screened from the detailed intention layer and records the screened detailed intention information as specific knowledge.

* * * * *